United States Patent [19]

Rouffet et al.

[11] Patent Number: 5,625,867
[45] Date of Patent: Apr. 29, 1997

[54] METHOD OF HANDING OFF TRAFFIC IN A LOW ORBIT SATELLITE COMMUNICATION SYSTEM SERVING TERMINALS AND COMMUNICATION SYSTEM USING A METHOD OF THIS KIND

[75] Inventors: Denis Rouffet, Boulogne Billancourt; Frédéric Berthault, Paris; Michel Mazzella, St Germain en Laye; Yannick Tanguy, Paris, all of France

[73] Assignee: Alcatel Espace, Courbevoie, France

[21] Appl. No.: 953,228

[22] Filed: Sep. 30, 1992

[30] Foreign Application Priority Data

Oct. 1, 1991 [FR] France ................... 91 12048

[51] Int. Cl.$^6$ ........................ H04B 7/185
[52] U.S. Cl. ............ 455/13.1; 455/33.2; 455/56.1; 379/60
[58] Field of Search ............... 455/12.1, 13.1, 455/13.2, 13.3, 13.4, 33.1, 33.2, 53.1, 54.1, 56.1

[56] References Cited

U.S. PATENT DOCUMENTS

| 5,119,504 | 6/1992 | Durboraw, III | 455/13.2 |
| 5,161,248 | 11/1992 | Bertiger et al. | 455/12.1 |

FOREIGN PATENT DOCUMENTS

| 6712990 | 5/1991 | Australia . | |
| 174540 | 3/1986 | European Pat. Off. | 455/12.1 |
| 0365885 | 5/1990 | European Pat. Off. . | |
| 421698 | 4/1991 | European Pat. Off. . | |

OTHER PUBLICATIONS

Moritz, Steve "Handoff Design Consideration for the Iridium System"Modern Science of Technology of Telecommunication Nov. 1991.
Proceedings Of The IEEE, vol. 75, No. 1, Jan. 1987, New York, US, pp. 74–81; R. Binder et al: "Crosslink Architectures for a Multiple Satellite System".

*Primary Examiner*—Reinhard J. Eisenzopf
*Assistant Examiner*—Thanh Le
*Attorney, Agent, or Firm*—Sughrue, Mion, Zinn, Macpeak & Seas

[57] ABSTRACT

In a method of handing off traffic in a low orbit satellite communication system serving terminals, a terminal being connected to a terrestrial communication network by means of a connection station, handing off of the satellite-terminal and satellite-connection station links is possible only within a particular area. The decision to hand off the traffic is based on deterioration of the quality of service and of the radio environment for a group of terminals of said area. The system for implementing this method includes transmit/receive terminals and terrestrial connection stations.

8 Claims, 6 Drawing Sheets

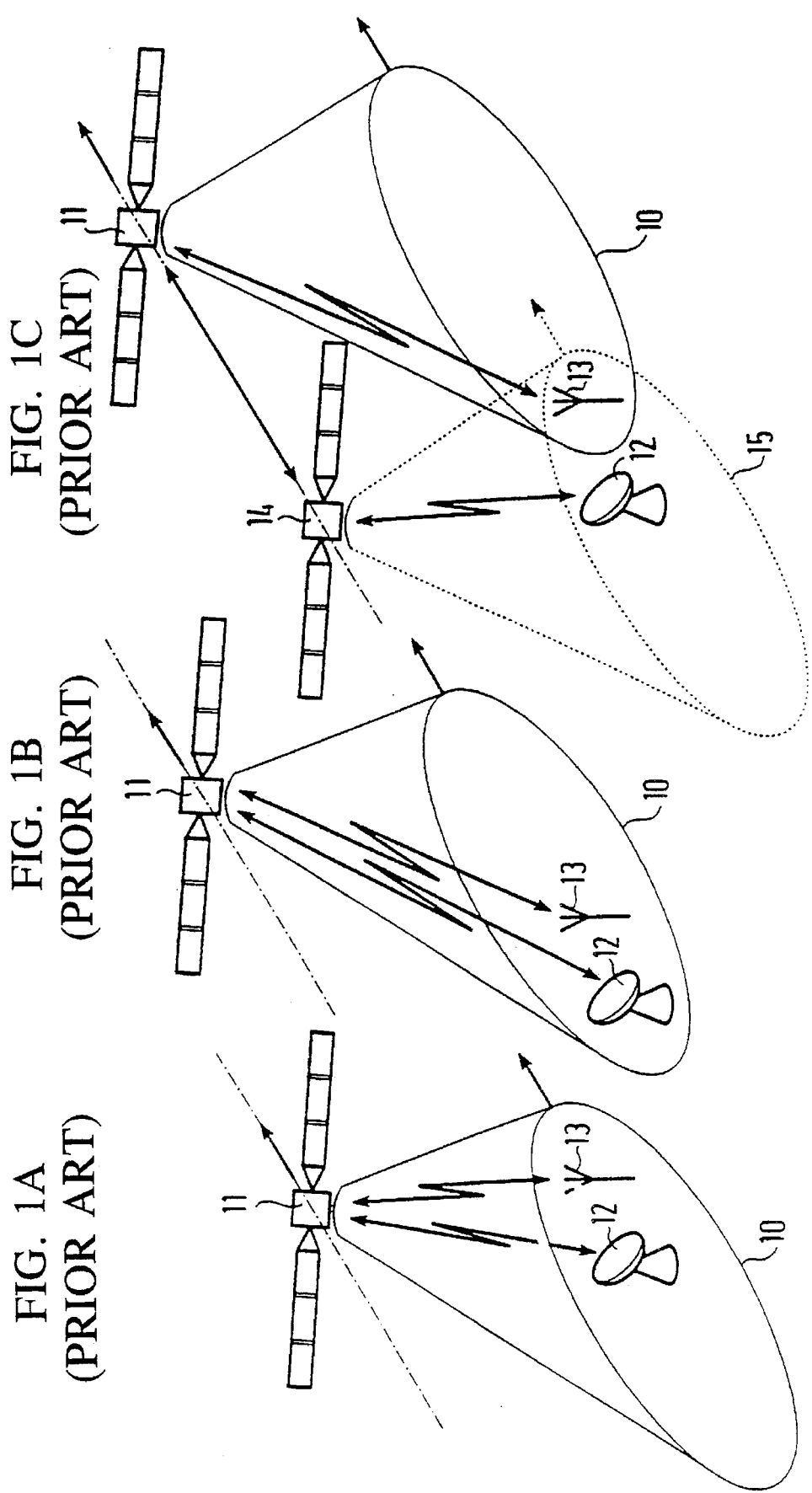

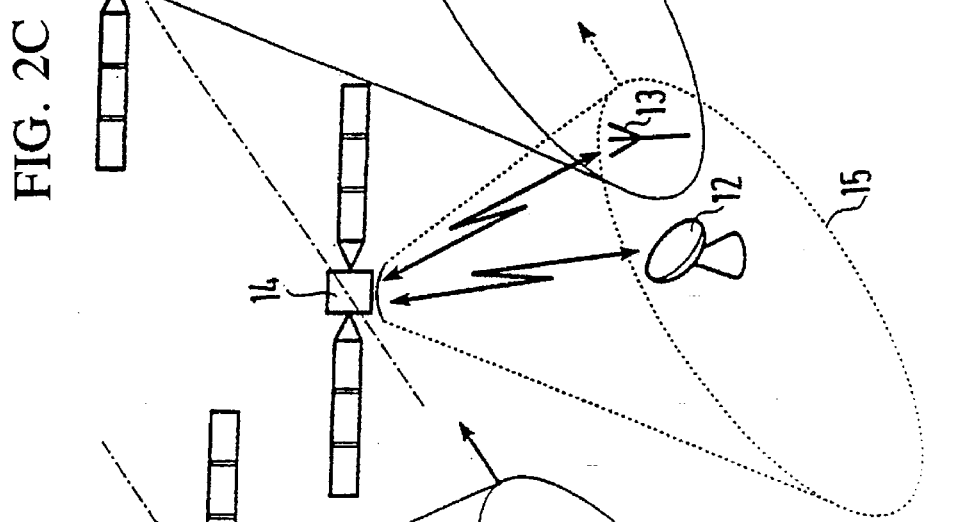
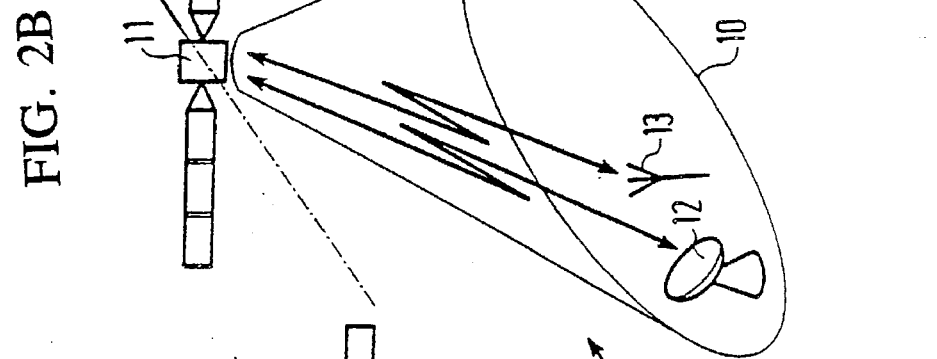
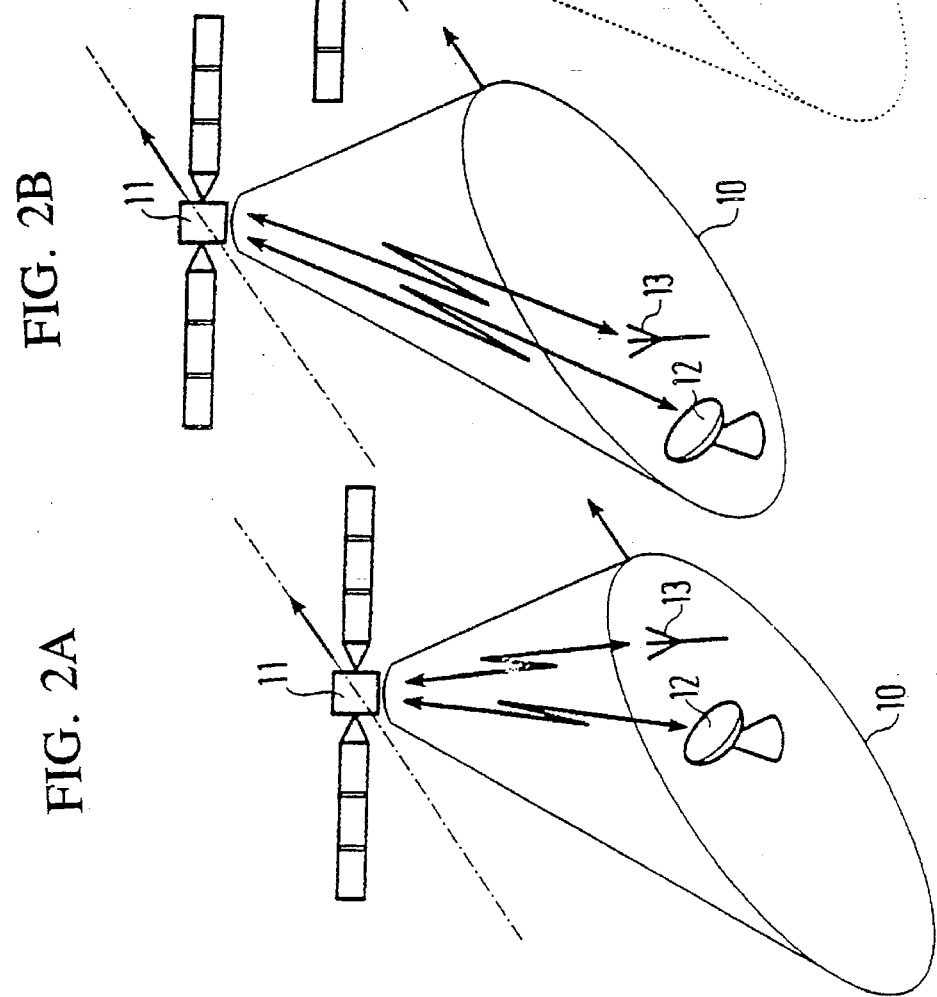

METHOD OF HANDING OFF TRAFFIC IN A LOW ORBIT SATELLITE COMMUNICATION SYSTEM SERVING TERMINALS AND COMMUNICATION SYSTEM USING A METHOD OF THIS KIND

BACKGROUND OF THE INVENTION

1. Field of the invention

The invention concerns a method of handing off traffic in a low orbit satellite communication system serving terminals which may or may not be mobile and which are transmitter-receivers or receivers only, a terminal being connected to a terrestrial communication network by means of a connection station.

The invention also concerns a communication system using a method of this kind.

2. Description of the prior art

Satellite-based communication with mobile terminals has until now used two types of orbit: geostationary satellite orbits and highly inclined elliptical orbits, both kinds being situated, on average, above areas known as the "Van Allen belts" characterized by a high concentration of particles. More recently lower orbits have been envisaged. Their altitude is between 800 and 2,000 km. One feature of satellite communication systems using these orbits is the possibility of communicating with a large number of mobile terminals, portable terminals, for example. The difference between orbits at altitudes above the "Van Allen belt" and those at lower altitudes is that the closer to the earth the satellite is located the lower is the attenuation.

A CCIR report (document US IWP 8/14-52, 1 Aug. 1990) entitled "Technical characteristics of a personal communication mobile satellite system" describes a low orbit satellite communication system using multibeam antennas. The resulting constellation of satellites comprises 77 satellites to provide global coverage. It is made up of seven planes each of eleven satellites each in a circular polar orbit. However, to maintain a call when a terminal leaves the coverage area of a first satellite, a system of this kind includes intersatellite links. A solution of this kind requires demodulation on board the first satellite, routing of the information, transmission to a second satellite and relay to the connection station. This is very complex and costly.

An object of the present invention is to minimize the cost of the space segment by using transparent satellites and eliminating all intersatellite links.

SUMMARY OF THE INVENTION

In accordance with the present invention handing off of the satellite-terminal and satellite-connection station links is possible only within a particular area; the decision to hand off the traffic being based on deterioration of the quality of service and of the radio environment for a group of terminals of said area.

In a first variant the traffic is handed off from a first satellite to a second satellite (14) having sufficient elevation over a particular area which is a satellite cell.

In a second variant the traffic is handed off from a first beam to a second beam of the same satellite.

In a first embodiment the traffic is handed off from the first beam to the second beam progressively; all new calls being set up via the same satellite; the decision to hand the remainder of the traffic off to the second beam being based on deterioration of the quality of service provided in the first beam and the radio environment of a group of terminals.

In a second embodiment the traffic is handed off from the first beam to the second beam globally; the instruction to hand off from the first beam to the second beam being sent to the connection station to all the terminals of the respective area when all parameters of the radio environment of said terminals reach a particular limit.

A particularly advantageous satellite communication system employing the method of the invention uses two constellations WALKER (1 389 km, 47°, 24/08/3) and WALKER (1 389 km, 55°, 24/08/3). A system of this kind is a world coverage system which complements existing communication systems. It enables a great variety of services to be offered. However, its main feature is that it can adapt to traffic and service situations differing from region to region.

Market analysis has shown that the main requirement for communication is regional, with niche markets of a world-wide nature. The architecture of a system of this kind is designed to adapt to this situation.

These applications concern closed networks and public networks. The basic service is digital telephony with all the ensuing data applications. Other services can also be provided using the Doppler shift due to the movement of the satellite. These are radio-navigation or radio-location services. There is also provision for using the radio-location service to carry out some base station assignment functions.

The invention will now be described in more detail with reference to the appended drawings.

BRIEF DESCRIPTION OF THE DRAWINGS

FIG. 1 shows the traffic handing off method in a prior art satellite system.

FIGS. 2 through 6 show the traffic handing off method in accordance with the invention.

DETAILED DESCRIPTION OF THE INVENTION

Figures 3A, 3B:
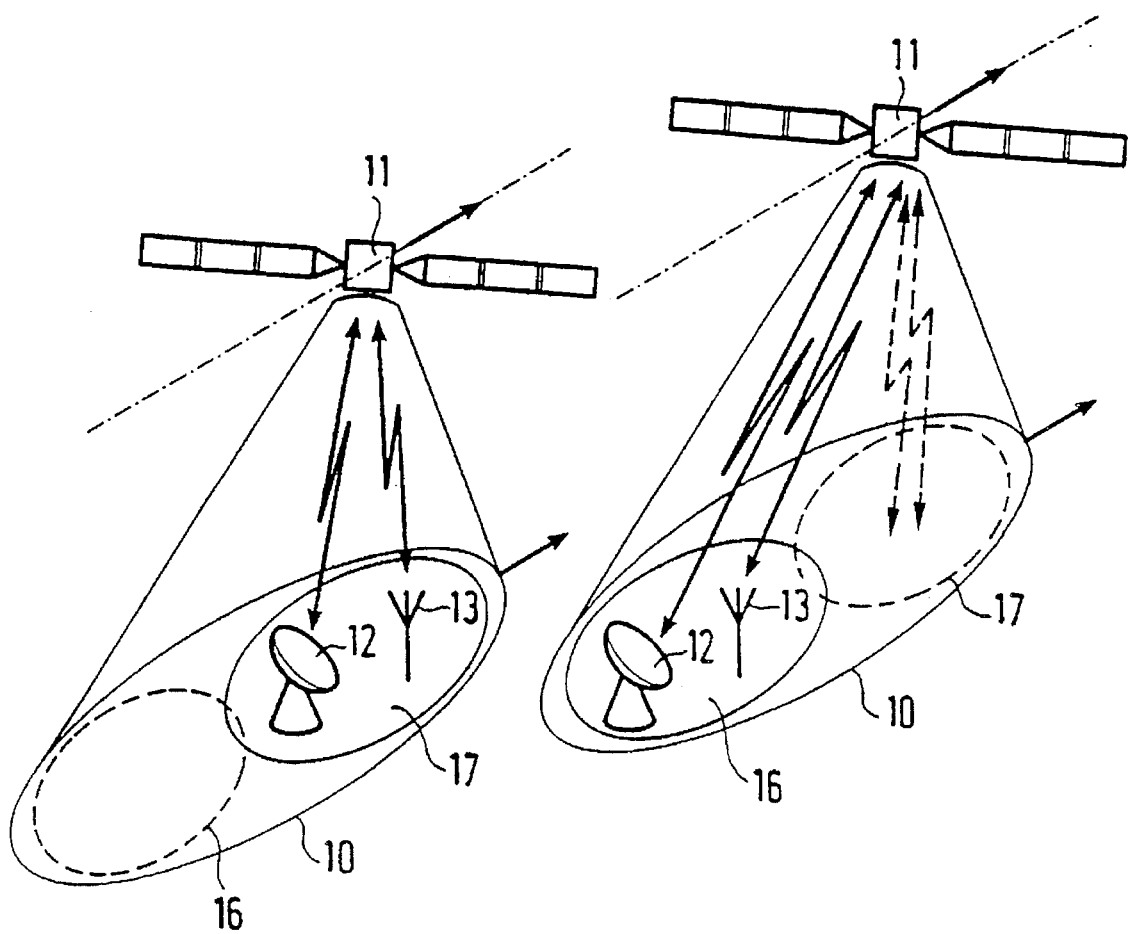

The satellite system or "constellation" is a worldwide coverage system which complements existing terrestrial communication systems. In this system a terminal, which may be mobile or not and is a transmitter-receiver or a receiver only, is identified, located and linked by a satellite of the constellation through a connection station to the fixed public network enabling the user to access all services of the public switched telephone network or the future ISDN.

The radio frequency resources allocated to the set of terminals are divided into satellite cells which each represent an area of small radius as compared with the satellite coverage area but of large radius as compared with a terrestrial cell of an earth cellular network of the "Groupe Spécial Mobiles" (GSM) type, for example. This cell is connected to a connection station and the terminals which are within this geographical area are connected to this station. The system must be aware in real time of all terminals that are "active" (calls set up or being set up) and terminals that are "on standby"; apart from when it is communicating, a terminal is regarded as on standby or inactive. In this system the terminals therefore belong to a satellite cell connected to a connection station which provides the connection to the earth cellular network.

In the "standby" mode the terminals receive a signal on a special frequency identifying the cell in which they are located and enabling them to determine the parameters assigned to that cell. Any new terminal becoming active in this cell sends its identification code. The procedure for updating the terminal location database is identical to that used in the terrestrial mobile radio communication infrastructure.

Compared with cellular networks, the satellite system does not require a large number of exchanges of data between the terminal location databases and the connection station. This is because of:

The large coverage radius of the satellite cell.

The fact that in the satellite cell network the handing off of a terminal from one cell to another is regarded as a very infrequent occurrence.

As far as a terminal is concerned, the network access coordinates are the radio frequency resource data and a channel frequency band. As far as the connection station is concerned, in addition to the data specific to the terminal, a satellite number is assigned in order to provide the link with the terminals in the cell associated with the connection station.

In a given cell the location and logging of terminals and call processing are exactly the same as in the terrestrial cellular network. Where call processing is concerned, the connection station processes an additional item of data comprising the number of the satellite having the best elevation for the cell in question. One of the connection stations includes additional equipment needed to track the satellites providing the radio coverage of the cell. These measurements transmitted to the ground control segment are used to calculate the ephemerides of the satellites and to deduce therefrom connection station antenna pointing tables.

In a cell the connection of the terminal to the terrestrial network is therefore accomplished by means of a connection station. This station has the following functions:

It manages a set of pre-assigned radio frequency resources and a set of overflow resources.

It handles the setting up and clearing down of links with the terminals.

It handles traffic for the satellite having the best elevation. This involves tracking the satellites and handing the traffic off from one satellite to another according to the respective elevation of each satellite.

It provides the connection to a terrestrial central office.

To implement these functions the connection station is made up of two separate entities:

a radio communication unit comprising the antenna and radio frequency (RF) subsystems and a signal processor subsystem (modems, etc), a management and connection unit managing the radio frequency part of the station (management of allocation of radio frequency resources, preparation and execution of satellite handing off, etc) and the subsystem managing exchanges with the terrestrial transmission segment.

Each connection station has three antennas with their associated RF subsystem. Two station antennas track the satellites. The third antenna serves as a back-up for the other two. Each antenna has a tracking system programmable on the satellite ephemerides. These pointing tables are supplied at regular intervals by the satellite control segment of the system.

From a general point of view, and as compared with a terrestrial cellular network, the system does not introduce any modifications into the overall architecture of the terrestrial network. The special features are restricted to the connection station and consist in the choice of the satellite having the best elevation for the area in question and in management of the handing off of traffic from one satellite to another.

To minimize the cost of the space segment the satellites are transparent and there are no intersatellite links.

The result of these two choices is that to maintain a call the mobile-satellite and satellite-connection station links are handed off from one satellite to another simultaneously. Because of this mode of operation:

location logging (roaming) is based on the connection of a terminal to the nearest connection station, there is a limiting distance below which the handing off of the satellite-mobile and satellite-connection station links is possible.

In estimating this distances allowances must also be made for:

an acceptable elevation in order to guarantee an adequate quality of service, the feasibility of the terminal and the connection station acquiring the carrier and synchronizing the new channel quickly.

To highlight the advantages of a solution of this kind FIGS. 1, 2 and 3 respectively show handing off requiring an intersatellite link and handing off in accordance with the invention which does not require any such link.

In FIG. 1A the coverage area 10 of the first satellite 11 includes a connection station 12 and a terminal 13.

In FIG. 1B the satellite 11 has moved but the connection station 12 and the terminal 13 are still in its coverage area.

In FIG. 1C the coverage area 10 of the satellite 11 no longer includes the connection station 12. The terminal 13-connection station 12 link must then pass through a second satellite 14 whose coverage area 15 includes said station 12.

In a first embodiment of the method of the invention the first two situations as shown in FIGS. 2A and 2B are the same. However, in FIG. 2C handing off from the first satellite (11) to the second satellite (14) has taken place. The terminal 13-connection station 12 link passes only via the second satellite 14.

FIG. 3 shows a second embodiment of the method of the invention. In FIG. 3A the coverage area of the first beam 17 includes a connection station 12 and a terminal 13. In FIG. 3B the coverage area of the beam 17 no longer includes the connection station 12 and the terminal 13. The terminal 13-connection station 12 link must then pass via the beam 16 of the same satellite 11 whose coverage area includes said station and said terminal.

The feasibility of handing off depends on complying with a set of constraints concerning the setting up of a link with a new satellite or with a new beam. The synchronization time-delay, shift and carrier frequency must be kept within the performance limitations of the signal processor units. The relative position of the connection station and the visible satellites are known from the ephemerides with sufficient accuracy. Only the position of the terminal relative to the connection station is unknown and therefore introduces a degree of uncertainty in respect of the elevation, synchronization, received carrier frequency.

The remainder of the description considers the first embodiment by way of example.

Consider the Doppler shift. At any given time a connection station knows exactly the Doppler shift of the entering satellite and that of the exiting satellite. This station can communicate to the terminal the Doppler shift that it sees at the time of handing off and that the terminal also sees subject to a small degree of uncertainty. In this case the terminal is able to pre-correct its receive and transmit frequency at the time of handing off. The uncertainty in respect of the Doppler shift to be compensated is then reduced to that resulting from the uncertainty in respect of the position of the terminal.

For a terminal of a given cell connected to a ground station the radio frequency resources it is allocated comprise a transmit/receive interval number (combination of TDMA or CDMA access and beam hopping in which N coverage spots on the ground are illuminated successively and sequentially in groups of P spots chosen from the N spots) and a frequency channel band.

Handing off is the change from a given state (radio frequency resource allocation, connection station, satellite number) to a new state. Handing off can arise as a result of:
an improved elevation of the satellite as seen from the fixed cell,
interworking of the terminal with another connection station (movement of the terminal from one cell to another),
a more favorable satellite beam radio environment.

The decision to hand off depends on the availability of a satellite having a better elevation in the geographical area in which the terminals and the connection stations are located.

Handing off is based on the satellite ephemerides and the known radio environment of the mobile. It must be as fast as possible so that it does not affect calls already set up.

When handing off is effected a series of synchronization data is sent to re-establish a normal call. The synchronization procedure is identical to that used in the terrestrial cellular network.

If resynchronization fails the terminal automatically returns to the radio frequency resources assigned to it before handing off and the operation is repeated.

There are two feasible execution scenarios: progressive or global handing off of traffic.

Figure 4:
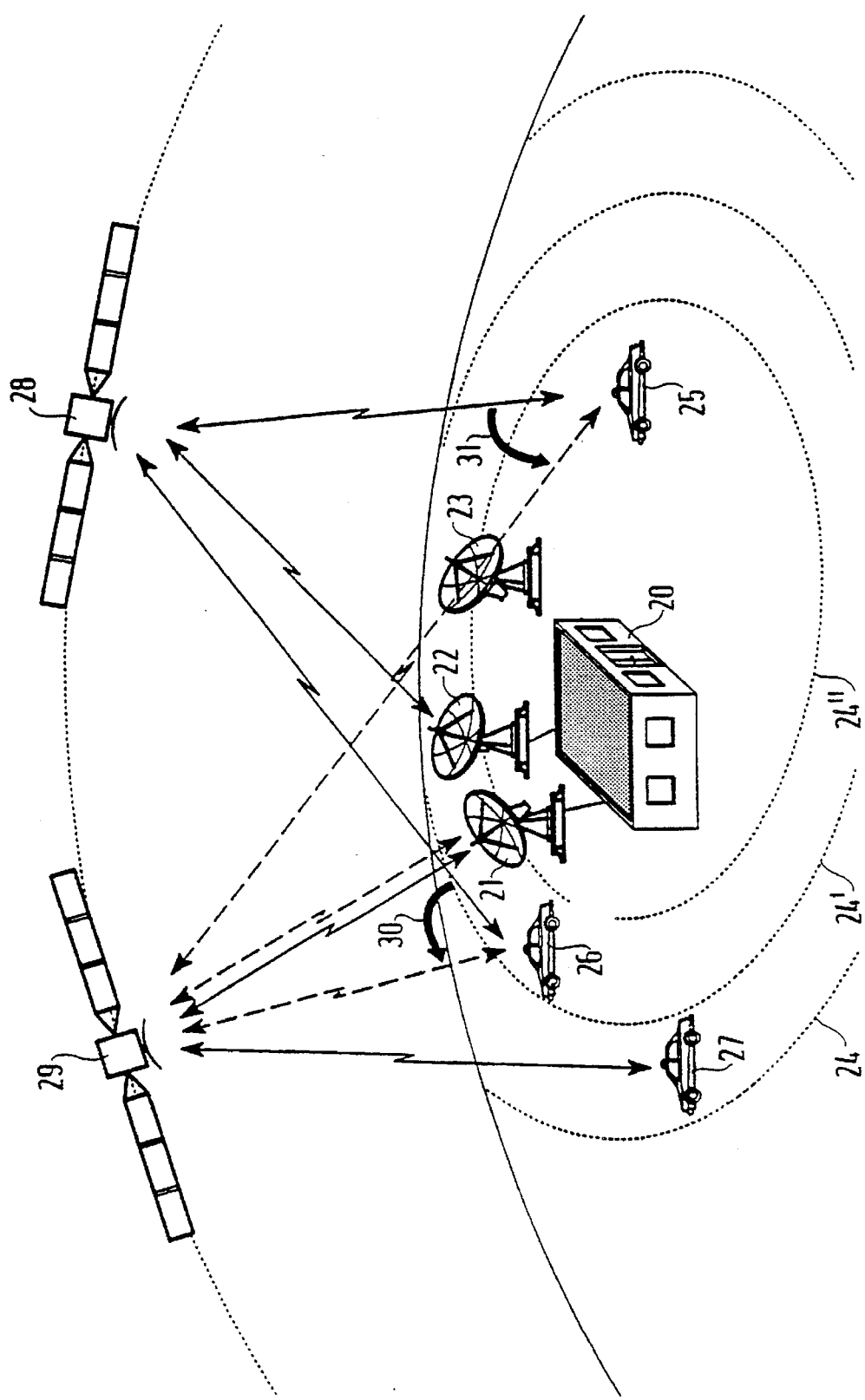

If progressive handing off of traffic from one satellite to another is employed, when a satellite has sufficient elevation on a satellite cell all new calls are set up via the new satellite. Then, as the quality of service provided by the first satellite deteriorates and the radio environment for a group of mobile terminals deteriorates, the decision is taken to hand this traffic off to the new satellite. This procedure favors progressive transfer of traffic from one satellite to the other. The radio environment of the terminals must be monitored continuously (monitoring beacon to be provided or direct communication with the terminals which then carry out series of measurements), as must the quality of service provided. FIG. 4 shows a connection station 20 with three antennas 21, 22 and 23 and an associated satellite cell 24. Two terminals 25 and 26 are connected to the station 20 via a first satellite 28. As the quality of service provided by the satellite 28 deteriorates, the cell 24 is progressively reduced in size (24' then 24"). The calling terminal 27 is connected to the station 20 directly via the second satellite 29. The decision to hand the terminals 25 and 26 off from the first satellite (28) to the second satellite (29), as defined above, are taken later (arrows 30 and 31).

Figure 5:
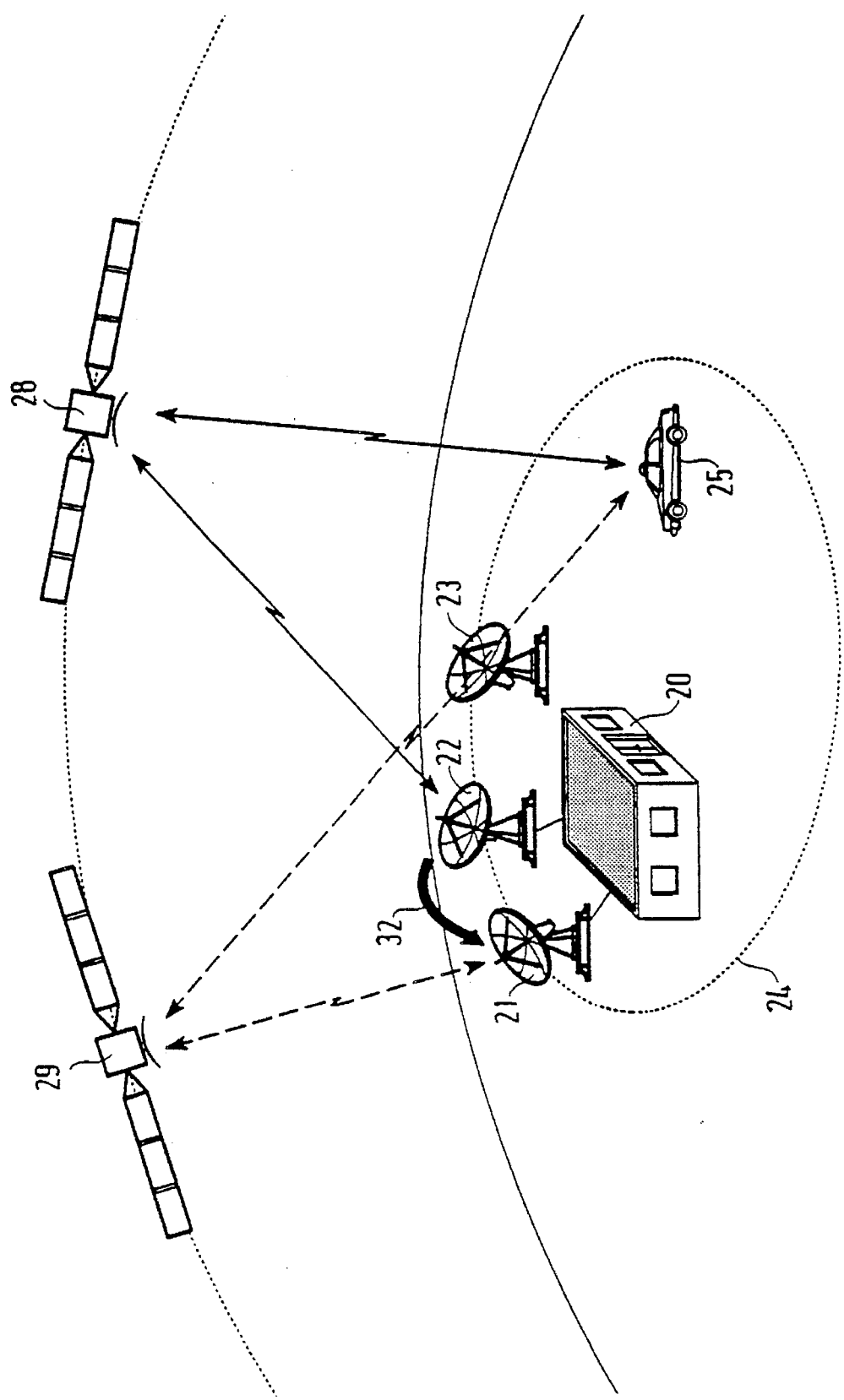

If all of the traffic is handed off globally from one satellite to the other, when the new satellite has favorable elevation as seen from the fixed satellite cell and when all parameters of the mobile radio environment reach a specified limit, the instruction to hand off from one satellite to the other is sent from the connection station to all the terminals as shown by the arrow 32 in FIG. 5. This global procedure affects all terminals in a given area. However, all the terminals must synchronize before continuing transmission and the allocations of radio resources to all the terminals must be taken into account instantaneously at the moment of handing off.

Figure 6:
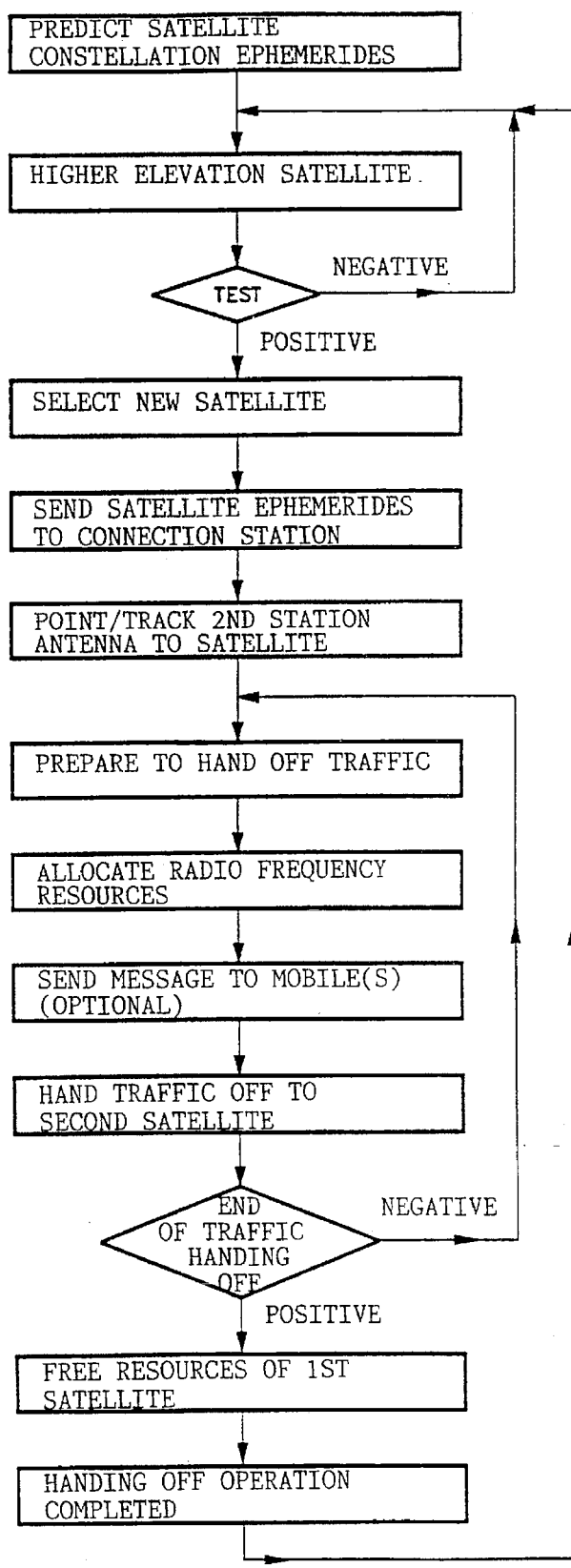

FIG. 6 explains preparation and execution of handing off.

The satellite having the best elevation for a given terrestrial area is selected from the ephemerides predictions for the constellation of satellites. This enables the connection station to acquire and track the new satellite and to prepare for the allocation of radio frequency resources.

The connection station decides to hand off and the instruction to hand off is routed via the link control subsystem. Execution of handing off entails the perfectly synchronized execution by the connection station and the terminals of the following actions:
for the mobile: a change of transmit and receive time; this results in a translation in time of the initial configuration,
for the connection station: handing off traffic to another antenna, one pointing to the new satellite.

Handing off uses the full range of GSM procedures without creating any new procedure. In the system described here this procedure is governed by the connection station.

A particularly advantageous system utilizing the method described above comprises at least one satellite constellation which belongs to the group of prior art constellations known as Walker symmetrical constellations. (See the article by J. G. Walker entitled "Continuous whole earth coverage by circular-orbit satellites" in "Satellite systems per mobile communications and surveillance", IEEE conference publication 95, 1973). These constellations are symmetrical because the satellites are regularly distributed in the same orbit and because of the distribution and equal inclination of the orbital planes in space. They have been chosen because they make it possible to minimize the number of satellites for a given coverage and are particularly efficient in covering a band of latitudes. A WALKER constellation is characterized by five parameters:

The altitude, in this instance 1 389 km (for reasons of service life).

The inclination.

The set of three parameters T/P/F:
T is the total number of satellites,
P is the number of orbital planes,
F is a phase parameter which indicates the relative positions of the satellites from one orbital plane to the next.

To optimize the coverage of inhabited areas, that is to say areas between the equator and 65° latitude (North or South), a WALKER (1 389 km, 52°, 48/8/1) constellation is required. This constellation has the advantage of enabling optimum coverage of the area, especially from the point of view of elevation, but like all constellations with a large number of satellites it has the drawback of requiring at least two years to set up. The system described here therefore uses two constellations which can be set up consecutively.

The constellations chosen are:
WALKER (1 389 km, 47°, 24/08/03) which covers correctly the CONUS and Southern Europe (typically to the latitude of Lille) but which has important coverage gaps below 30° latitude.
WALKER (1 389 km, 55°, 24/08/03) which covers the rest of the world and makes it possible to optimize coverage, especially elevation, in countries between latitudes 10° and 60°.

Note that the first constellation of 24 satellites includes areas in which the minimal elevation is below that required. These areas are mobile and at low latitudes. The time for which no satellite is visible at any given point is relatively short. For higher latitude areas the average elevation is clearly higher and the coverage is free of gaps. The defects are corrected by the launch of the second constellation.

Of course, the present invention has been described and shown by way of preferred example only and its component parts may be replaced by equivalent parts without departing from the scope of the invention. The explanations given above with reference to the first embodiment of the method of the invention are naturally valid in respect of the second embodiment: thus handing off from the first beam to the second may be progressive or global.

There is claimed:

1. A communication system, comprising:

low orbiting satellites free of intersatellite links, including a first and a second satellite;

a plurality of connection stations, each of which defines a respective fixed cell, and each of which provides a terrestrial communications network interface;

a plurality of terminals, including (1) active terminals involved in a call, and (2) terminals on standby; and signal processing units, contained respectively in each of said satellites, in each of said plurality of terminals, and in each of said plurality of connection stations;

wherein a respective position of each of said first and said second satellite is known at each of said plurality of said connection stations from respective satellite ephemerides of said first and said second satellite;

wherein each of said plurality of terminals in a respective fixed cell communicates with a corresponding one of said plurality of connection stations via a respective satellite-terminal link with said first satellite, and further via a corresponding respective satellite-connection station link between said first satellite and said corresponding one of said plurality of connection stations;

wherein each said respective satellite-terminal link and each said corresponding respective satellite-connection station link define a respective pair of links; and wherein said respective pair of links is handed off simultaneously and in real time from said first satellite to said second satellite after a handing-off decision by said corresponding one of said plurality of connection stations.

2. The system as set forth in claim 1, wherein:

said handing-off decision uses predetermined constraints and said ephemerides to ensure that synchronization time-delay, Doppler shift, and carrier frequency do not deteriorate beyond minimum performance limitations of said signal processor units; and wherein said predetermined constraints take into account a degree of uncertainty as to a position of each of said plurality of terminals in said respective fixed cell relative to said corresponding one of said plurality of connection stations.

3. The communications system as set forth in claim 2, wherein:

said handing-off decision is a single decision, is effected for all of said plurality of terminals in said respective fixed cell, and causes said respective pair of links for every one of said plurality of terminals in said respective fixed cell to be handed off.

4. The communications system as set forth in claim 2, wherein:

said handing-off decision is given effect for each respective pair of links according to the following rules:

for each of said terminals on standby in said respective fixed cell, said handing-off decision causes all new terminal calls to be placed through said second satellite; and for each of said active terminals in said respective fixed cell, said handing-off decision is effected during said call when a quality of service of said call deteriorates to a predetermined threshold.

5. The communications system as set forth in claim 3, wherein:

each of said low orbiting satellites further comprises a multibeam antenna having a first and a second beam;

wherein said respective pair of links is handed off simultaneously and in real time from said first beam to said second beam after a corresponding decision to hand off which is made by said corresponding one of said plurality of connection stations.

6. The system as set forth in claim 5, wherein:

said corresponding decision to hand off uses said predetermined constraints and said ephemerides to ensure that synchronization time-delay, Doppler shift, and carrier frequency do not deteriorate beyond said minimum performance limitations of said signal processor units; and wherein said predetermined constraints take into account said degree of uncertainty as to said position of each of said plurality of terminals in said respective fixed cell relative to said corresponding one of said plurality of connection stations.

7. The communications system as set forth in claim 6, wherein:

said corresponding decision to hand off is a single decision, is effected for all of said plurality of terminals in said respective fixed cell, and causes said respective pair of links for every one of said plurality of terminals in said respective fixed cell to be handed off from said first beam to said second beam.

8. The communications system as set forth in claim 6, wherein:

said corresponding decision to hand off is given effect for each said respective pair of links according to the following rules:

for each of said terminals on standby in said respective fixed cell, said handing-off decision causes all new terminal calls to be placed through said second satellite beam; and for each of said active terminals in said respective fixed cell, said handing-off decision is effected during said call when said quality of service of said call deteriorates to said predetermined threshold.

* * * * *